Jan. 30, 1945. J. H. BENT ET AL 2,368,404
EXTRUSION PRESS
Filed Oct. 30, 1940 2 Sheets-Sheet 1
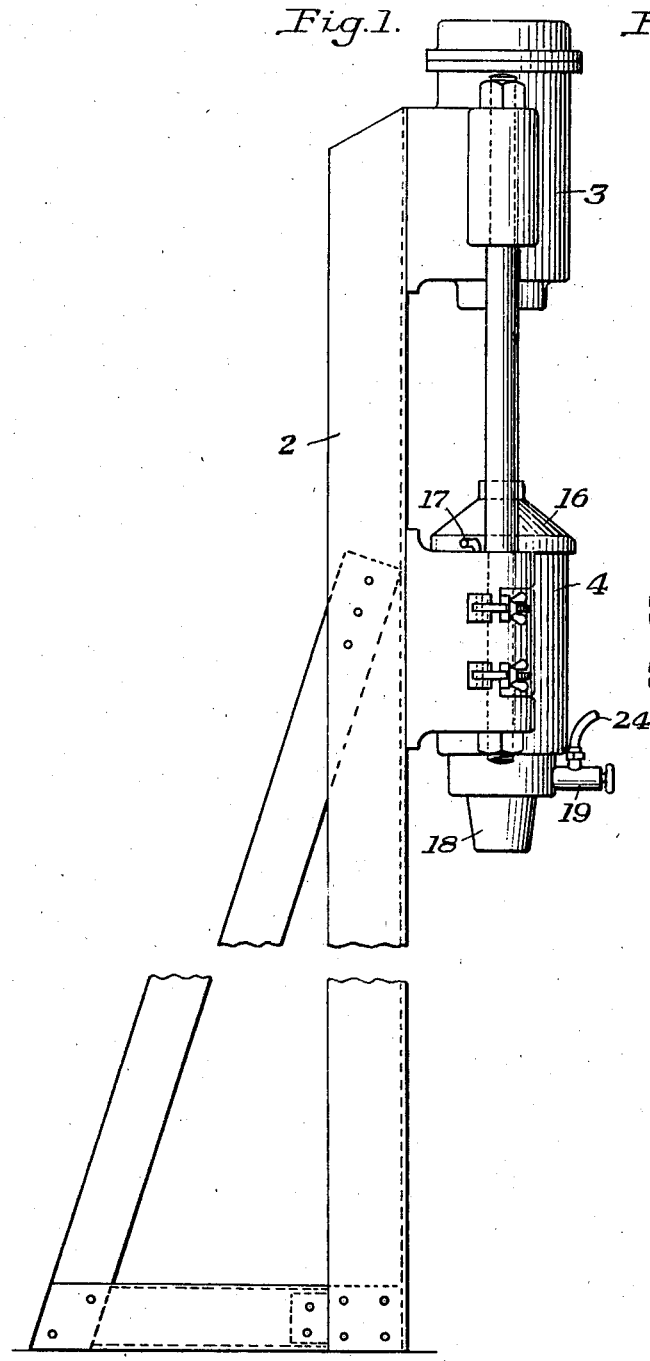
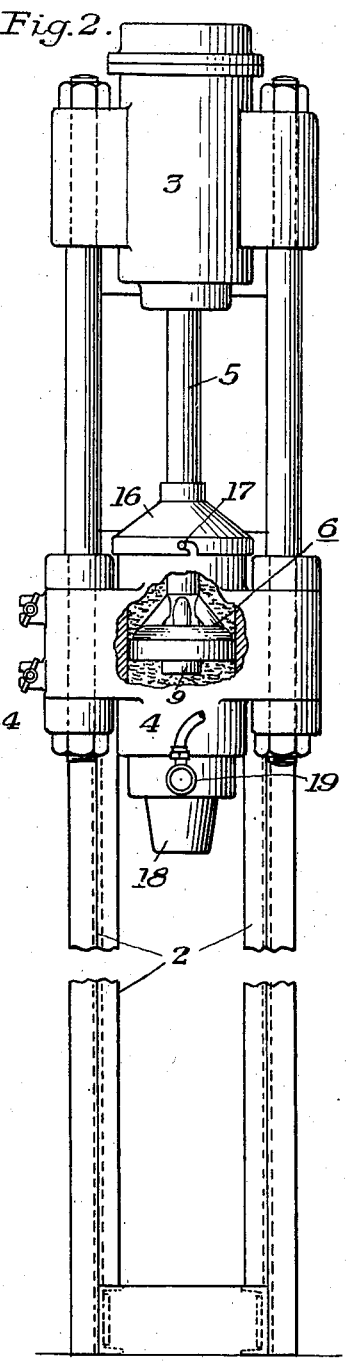
INVENTORS
John H. Bent
Robert W. Pearson
by their attorneys
Christy, Parmelee & Wharton Jan. 30, 1945.  J. H. BENT ET AL  2,368,404
EXTRUSION PRESS
Filed Oct. 30, 1940   2 Sheets-Sheet 2
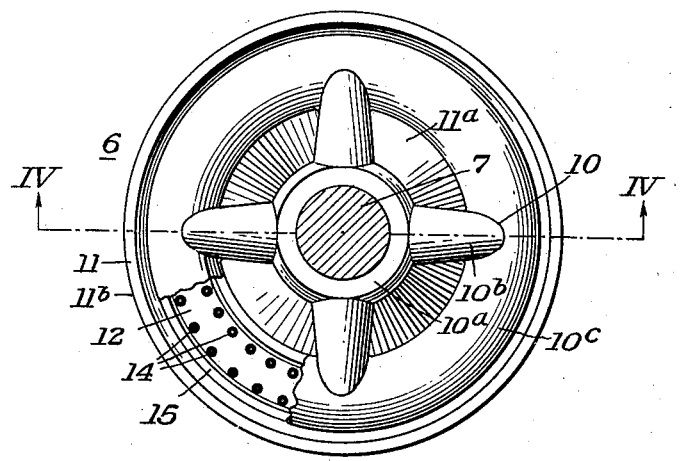
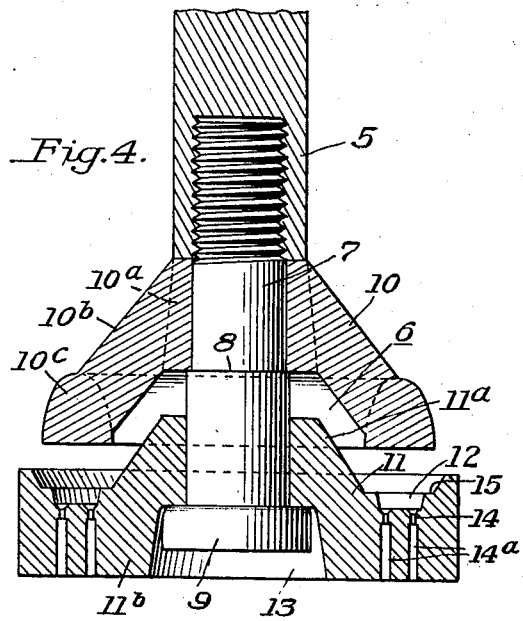
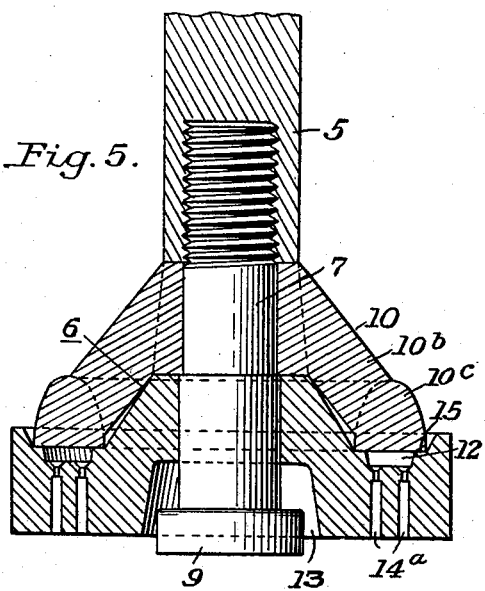
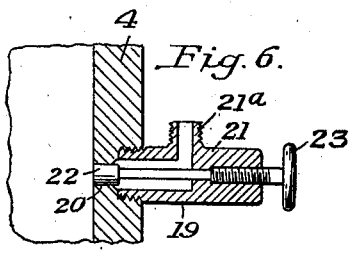
INVENTORS
John H. Bent
Robert W. Pearson Patented Jan. 30, 1945

2,368,404

UNITED STATES PATENT OFFICE 2,368,404

EXTRUSION PRESS

John H. Bent and Robert W. Pearson, Pittsburgh, Pa., assignors to Stupakoff Laboratories, Inc., Pittsburgh, Pa., a corporation of Pennsylvania Application October 30, 1940, Serial No. 363,426

9 Claims. (Cl. 25—15)

This invention pertains to the extrusion of plastic materials into rods, tubes and various shapes, and is for an improved press and method of extruding through the use of such a press.

There are two types of machines which are used to extrude plastic materials, such as various clay compositions and ceramic materials, into rods, tubes and various shapes. One type of machine is the screw-feed machine in which a spiral screw is used to advance the material and force it through a die. This machine is very satisfactory for many purposes, but it cannot be used under all conditions, particularly where the material is stiff and offers considerable resistance. The other type of machine which is commonly used is a press, usually an hydraulic press. An hydraulic press can be used for extruding all material and does not have the disadvantages of the screw-feed machine. Essentially it consists of an hydraulic power cylinder which forces a piston into another cylinder containing the material to be extruded. The material is forced from this second cylinder through a die at a uniform and controllable speed, and imparts a smooth straight structure in the clay or other substance being extruded as contrasted with a spiral texture in the materials where a screw-feed is employed. Such a press has the disadvantage that its operation is intermittent, and prior to the present invention it has been necessary after one batch of material has been extruded, to raise the piston out of the top of the cylinder in order to permit the cylinder to be refilled. This upstroke of the piston serves no useful purpose.

Another disadvantage in the use of such presses has been that with certain types of materials it is desirable to remove as far as possible contained air from the plastic mass before it is extruded. This has heretofore been done by subjecting the mass to an evacuation treatment in a separate machine. After the plastic material has been evacuated, it is then transferred to the extrusion press. This requires additional handling, and the material may become contaminated or lose some of its moisture, thus changing its properties.

According to the present invention, we have developed a press in which the disadvantages above referred to have been eliminated. Fundamentally the press is the same as previous ones in that there is a cylinder to receive the material to be extruded and a piston for forcing the material out of a die at the end of a cylinder. However, in the present invention both the up and down strokes of the piston serve a useful purpose, make the press easier to charge, and provide for the effective evacuation of the material in the press itself. According to our invention the piston of the press is perforated and valved in such a way that the material to be extruded is charged into the cylinder at the end of the pressing stroke of the piston. Then, as the piston is raised, the material is forced through the perforations in the piston thereby effectively breaking up or shredding the material. When the piston has reached the uppermost limit of its travel and starts to move in the opposite direction, the valve closes the holes so that the material cannot be forced back through the piston, and the material is thus pressed by the downward stroke of the piston through the extruding die at the end of the cylinder.

The shredding of the material in the manner described is very important and aids in producing a superior product. It removes all lumps and foreign objects and also prepares the material for evacuation, and means is provided whereby the air may be exhausted from the cylinder as the material is being shredded to thus accomplish evacuation directly in the press.

The invention also accomplishes a novel method in the extrusion of the plastic material through the working of the material which is afforded in forcing it through the holes in the piston and breaking it up into shreds and in subjecting the shredded material to a step of evacuation immediately before the extruding pressure is applied.

Our invention may be readily understood by reference to the accompanying drawings which illustrate one embodiment of our invention and in which Figure 1 is a side elevation of a press embodying our invention;

Figure 2 is a front elevation thereof;

Figure 3 is a top plan view of the extruding piston, a portion of the valve structure being broken away and the piston rod being shown in section;

Figure 4 is a detail view showing a transverse vertical section through the piston with the parts in the position which they assume during the upstroke of the piston;

Figure 5 is a view similar to Figure 4 showing the position of the parts of the piston on the downstroke of the piston;

Figure 6 is a detail view showing a form of valve which may be provided in the wall of the cylinder for use in connection with evacuating the material.

Referring to the drawings, the press shown in Figures 1 and 2 is generally similar to hydraulic presses now provided for this purpose. The press has a supporting frame 2 which carries an hydraulic cylinder 3 at the top thereof. Supported on the frame 2 under the hydraulic cylinder 3 is an extruding cylinder 4. A piston, not shown, in the hydraulic cylinder 3 operates a piston rod 5 having a piston 6 at the lower end thereof. The piston 6 operates in the cylinder 4. Except for the construction of the piston 6, the parts heretofore described are of the conventional construction.

The construction of the piston 6 is clearly shown in Figures 3, 4 and 5. At the lower end of the piston rod 5 there is a socket into which is screwed a pin 7 having a shoulder thereon at 8 and having a head 9 at its lower end. Carried on the pin 7 and confined between the shoulder 8 and the end 5 of the piston rod is a valve member 10. This valve member 10 has a central sleeve portion 10a from which project a plurality, preferably 4, downwardly and outwardly extending arms 10b. These arms are connected at their lower ends to a ring 10c. The valve member 10 is thus essentially in the form of a spider having a central sleeve and having a valve portion and having webs that connect the sleeve and the valve portion.

Below the valve member 10 is the piston element 11. This piston element has a central sleeve portion 11a that is slidable on that portion of the pin above the head 9 and below the shoulder 8. Around the sleeve portion 11a is a rim portion 11b which has an annular channel 12 in the upper face thereof. The member 11 has a central recess 13 therein to receive the head 9 of the pin 7. Formed in the rim portion 11b at the bottom of the channel 12 are a plurality of holes 14, these holes having an upper portion of reduced diameter, the extreme upper ends of the holes, however, preferably being chamfered. The lower portions of the holes are counterbored to provide portions 14a of relatively larger diameter. At each side of the channel 12 in the rim 11b are annular shoulders or seats 15 for cooperation with the ring 10c of the valve member 10.

In the operation of the press, the press is charged when the piston 6 is at the bottom of the cylinder 4. To enable the cylinder to be charged, the top of the cylinder is provided with a cover 16 through which the piston rod 5 slides and which may be locked in place on the top of the cylinder by any suitable means, a bayonet pin and slot connection being shown at 17 in Figures 1 and 2. In charging the plastic material into the press, the cover 16 is lifted and the material is charged in on top of the piston. The cover 16 is then locked in closed position, and the cylinder 3 is operated to raise the piston 6. As the piston 6 moves up through the material, the plastic material above it will be forced through and around the valve member 10 through the holes 14 in the piston and will drop into the bottom of the cylinder. As the material flows through the holes 14, it will of course be broken up into small streams or shreds. A sufficient number of holes 14 is provided so that the upward movement of the piston will not be impeded too much. By providing the enlarged counterbore 14a below the holes 14, the resistance to the movement of the piston through the plastic material is considerably less than it would be if the holes 14 were of uniform diameter. During the upward movement of the piston, the parts are in the position shown in Figure 4, the piston 11 being separated from the valve 10 and being engaged by the head of the pin 7. When the piston reaches the top of its stroke and its motion is reversed, the resistance of the plastic material to the downward movement of the piston forces the piston upward relatively to the valve to the position shown in Figure 5 where the portion 10c of the valve is seated tightly on the annular shoulders 15 of the piston. The plastic material is thus prevented from flowing back through the piston and the piston applies the pressure necessary for extruding the plastic material from the die 18 at the bottom of the cylinder 4.

The construction of the piston thus provides an arrangement whereby the plastic material may be charged into the cylinder 4 when the piston is at the lower limit of its stroke and useful work is performed in raising the piston by reason of the fact that with many materials which are extruded, the shredding of the mass or the breaking of it into small streams as it flows through the holes 14 accomplishes highly beneficial results and serves to further break up lumps.

Also, by reason of the fact that the material is thus broken up into small streams or shreds as the piston is forced upwardly, the material may be effectively evacuated to remove entrained air at this time.

Our invention contemplates that the cylinder 4 may be provided at one or more points with connections leading to a vacuum pump so that as the material is shredded through the piston, air can be evacuated from it and the material will thus be in prime condition for extrusion upon the succeeding downward stroke of the piston. For connecting the interior of the cylinder with a vacuum pump, we have shown a valve designated generally as 19 adjacent the lower end of the cylinder. One form of valve suitable for the purpose is shown in Figure 6. In this figure the wall of the cylinder 4 has a hole 20 therein. Screwed into the wall of the cylinder is a valve body 21. The valve itself comprises a plug 22 which fits into the hole 20. A hand screw 23 is provided for backing the plug 22 out of the hole. The valve head 21 is provided with a nipple 21a to which is connected a pipe or tube 24 leading to a vacuum pump, not shown.

The arrangement of the valve is such that when the hand wheel 23 is screwed as far as it can be turned in one direction, the plug 22 will fill the hole 20 and be flush with the interior wall of the cylinder. The plug is normally in this position during the pressing stroke of the piston. When the material is to be shredded and before the piston starts upwardly, the hand screw 23 is operated to withdraw the plug 22 from the hole 20, whereupon communication is established between the interior of the cylinder 4 and the vacuum pump. After the completion of the upward stroke of the piston, the valve is again closed. By providing a plug of this nature, the material in the press cannot be forced back into the valve when the material is under pressure, and is being extruded. As the plastic material shreds through the upwardly moving piston, it collects as an intumescent mass in the bottom of the cylinder so that as the material builds up, the passage to the valve is not obstructed and the process of evacuation can continue as long as the shredding of the material is taking place.

From the foregoing, it will also be seen that our invention accomplishes a novel method in the extrusion of plastic materials in that the material is worked and broken up into fine shreds immediately before it is extruded, and also, it is evacuated immediately before it is extruded. While the particular mechanism described is especially useful in accomplishing this method, it will be obvious that various other mechanisms may be employed for the purpose.

In the foregoing specification, we have specifically shown and described one preferred embodiment of our invention and one preferred apparatus for the practice of our method, but it will be understood that various changes and modifications may be made within the contemplation of our invention and under the scope of the following claims.

We claim as our invention:

1. A press for the extrusion of plastic materials having a piston having a passage therethrough and a valve for said passage, said valve being self-operable upon movement of the piston and serving to close the passage when the piston moves in a direction to extrude material and open the passage when the piston moves in the opposite direction, and a cylinder in which the piston has a working fit having a closure at one end thereof and a die at the other end thereof.

2. An extrusion press having a cylinder with an extrusion die at one end thereof and a closure at the other end, a piston having a working fit in the cylinder, the piston having a plurality of small passages therein, and valve means operable upon movement of the piston for automatically closing the passages when the piston moves in the cylinder toward the die and open the passages when it moves in the cylinder in a direction away from the die.

3. An extrusion press comprising a cylinder having an extruding die at one end thereof and having a removable closure at the other end, a piston in the cylinder having a plurality of relatively small passageways therethrough, and self-operating valve means on the piston arranged to close said passageways when the piston moves toward the die and to open said passages when the piston moves away from the die.

4. An extrusion press comprising a cylinder having an extrusion die at one end thereof, a removable cover at the opposite end of the cylinder through which plastic material may be charged into the cylinder, and piston means operable in the cylinder having a plurality of openings therein whereby the pistons may pass through plastic material confined in the cylinder between the piston and the cover in the cylinder when it is moving in a direction away from the die and thereby shred the material through the other end of the cylinder, and means operable upon movement of the piston for closing said openings on the movement of the piston toward the die, whereby the piston compacts the shredded material and extrudes it through the die.

5. An extrusion press comprising a cylinder having an extruding die at one end thereof and having a movable closure at the other end, a piston in the cylinder having a plurality of relatively small passageways therethrough, movable means on the piston for closing said passageways when the piston moves toward the die and to open said passages when the piston moves away from the die, and a valved passageway leading from the die end of the cylinder.

6. An extrusion press comprising a cylinder having an extruding die at one end thereof and a movable closure at the other end, a piston in the cylinder having a plurality of relatively small passageways therethrough, valve means on the piston arranged to close said passageways when the piston moves toward the die and to open said passages when the piston moves away from the die the arrangement enabling plastic material to be confined in the end of the cylinder carrying the closure when the piston is at the die end of the cylinder and the material may be forced through the small passageways on the travel of the piston toward the closure, and a valved passageway leading from the end of the cylinder adjacent the die for connection to a vacuum pump.

7. An extrusion press comprising a cylinder having an extruding die at one end thereof a removable closure on the other end of the cylinder, a piston in the cylinder having a plurality of relatively small passageways therethrough, valve means on the piston arranged to close said passageways when the piston moves toward the die and to open said passages when the piston moves away from the die, and means leading from the cylinder adjacent the die for evacuating air therefrom during movement of the piston in a direction away from the die.

8. A plastic extrusion press comprising a cylinder having an extruding die at one end thereof and having a movable closure at its other end, a piston in the cylinder, a piston rod on which the piston is carried and with respect to which the piston has a limited relative movement, a valve member on the piston rod at that side of the piston which is remote from the die, the piston having a plurality of openings therethrough, said valve element being adapted to permit the passage of material through said openings when the piston is moving away from the die and close the openings when the piston is moving toward the die.

9. A plastic extrusion press comprising a cylinder having an extruding die at one end thereof and having a movable closure at its other end, a piston in the cylinder, a piston rod on which the piston is carried and with respect to which the piston has a limited relative movement, a valve member on the piston rod at that side of the piston which is remote from the die, the piston having a plurality of openings therethrough, said valve element being adapted to permit the passage of material through said openings when the piston is moving away from the die and close the openings when the piston is moving toward the die, and means for evacuating gases from the interior of the cylinder during the motion of the piston in a direction away from the die.

JOHN H. BENT.
ROBERT W. PEARSON.